United States Patent [19]

Damouth

[11] Patent Number: 5,333,255
[45] Date of Patent: Jul. 26, 1994

[54] APPARATUS FOR DISPLAYING A PLURALITY OF TWO DIMENSIONAL DISPLAY REGIONS ON A DISPLAY

[75] Inventor: David E. Damouth, Rochester, N.Y.

[73] Assignee: Xerox Corporation, Stamford, Conn.

[21] Appl. No.: 637,231

[22] Filed: Jan. 3, 1991

[51] Int. Cl.$^5$ .................................................. G06F 15/62
[52] U.S. Cl. ..................................... 395/157; 395/158; 395/155; 395/135
[58] Field of Search ............... 395/155, 157, 158, 160, 395/119, 121, 122, 133–135

[56] References Cited

U.S. PATENT DOCUMENTS

| | | | |
|---|---|---|---|
| 4,783,648 | 11/1988 | Homma et al. | 340/724 |
| 4,823,108 | 4/1989 | Pope | 340/721 |
| 5,008,853 | 4/1991 | Bly et al. | 395/157 X |
| 5,088,052 | 2/1992 | Spielman et al. | 395/158 |
| 5,101,365 | 3/1992 | Westberg et al. | 395/158 |
| 5,175,813 | 12/1992 | Golding et al. | 395/158 X |

Primary Examiner—Gary V. Harkcom
Assistant Examiner—Almis Jankus
Attorney, Agent, or Firm—Finnegan, Henderson, Farabow, Garrett & Dunner

[57] ABSTRACT

An apparatus for displaying a plurality of two dimensional display regions includes a currently displayed display region on a surface of a visual display. A pointing device generates X and Y coordinate signals corresponding to locations on the display and a Z increment signal, and a pointer is displayed on the display at a location corresponding to a set of the X and Y coordinate signals. A sequence of two dimensional display regions is stored in a memory circuit, and a display region succeeding the currently displayed display region in the sequence or a display region preceding the currently displayed display region in the sequence is selected in response to the Z increment signal irrespective of whether the location at which the pointer is displayed coincides with the selected display region. The display regions are displayed on the display in accordance with the sequence such that the selected display region appears as the currently displayed display region, and display regions succeeding the selected display region in the sequence appear overlapped by the selected display region in a third dimension normal to the surface of the display with each of the displayed display regions being displayed in its entirety except where overlapped by a preceding display region in the sequence. The selected display region is displayed in its entirety.

10 Claims, 10 Drawing Sheets

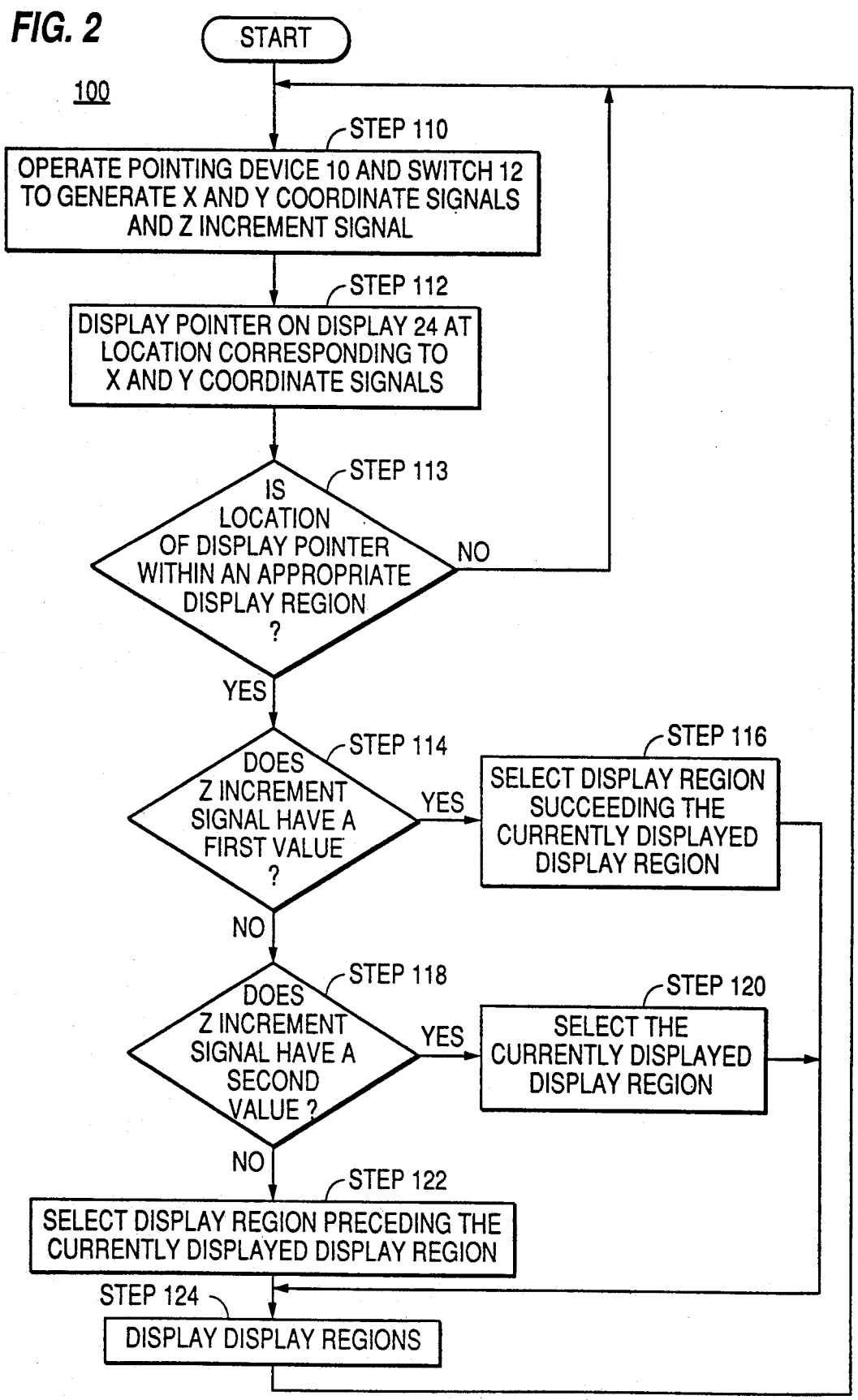

APPARATUS FOR DISPLAYING A PLURALITY OF TWO DIMENSIONAL DISPLAY REGIONS ON A DISPLAY

BACKGROUND OF THE INVENTION

Field of the Invention

The present invention relates to an apparatus for displaying a plurality of two dimensional display regions on a visual display. More specifically, the invention relates to an apparatus for displaying a plurality of two dimensional display regions on a visual display for use with a computer system incorporating a display windowing environment.

Description of the Related Art

In computer systems incorporating a display windowing environment, e.g., XEROX VIEWPOINT, MICROSOFT WINDOWS, LOTUS 1-2-3 (release 3), APPLE/MACINTOSH, etc., a plurality of display regions, typically called "windows" and/or "icons," can be simultaneously displayed on a visual display so as to partially, and sometimes completely, overlap one another while maintaining an arbitrary or predetermined positional relationship. Each display region defines a boundary within which is typically displayed text and/or graphics. In order to perform an operation, e.g., word processing, on the text and/or graphics within a particular display region, it is necessary that an operator first select the display region. Further, if the display region is displayed such that it is overlapped by one or more other display regions, it is also necessary that the display region to be edited be completely visible.

In one type of conventional system, to select a display region that is overlapped by one or more other display regions, an operator uses a pointing device called a "mouse" to move a pointer, e.g., a cursor, arrow, etc., about the display such that the pointer coincides with a visible portion of the display region. By depressing a button on the mouse, the display region becomes "active" whereby it appears, for example, highlighted. Once made active, the display region can be moved about the display such that is appears completely visible, i.e., it is no longer overlapped by any other display regions. In some of these systems, to make an activated display region completely visible, an operator must move the mouse pointer to a special region of the activated display region and, subsequently, depress the mouse button. In other systems, if the operator moves the mouse pointer to a particular region of the display region and, subsequently, depresses the mouse button, a menu of commands, such as "Top," "Bottom," "Just Below Top," etc., is displayed. By selecting the appropriate command, the activated display region can be made completely visible, partially visible or completely hidden. A major drawback of these conventional systems is that in order to select a display region which is entirely overlapped by one or more other display regions it is necessary to first activate the overlaying display regions and move them about the display until at least a portion of the underlying display region becomes visible.

In a second type of conventional system, a special region of the display can be expanded into a menu which contains a list of names corresponding to the display regions. To select one of the display regions, an operator must move the mouse cursor until it coincides with the name corresponding to the display region. Once selected, the display region instantaneously becomes completely visible. Similarly, if the system does not use a mouse or other pointing device, the operator must type the name of the display region onto a keyboard. In such a system, by typing a command, such as "Go To," "Next" "Previous," etc., in addition to the display region name, the display region can be made completely visible, partially visible, or completely hidden. However, a drawback of these conventional systems is that an operator must remember the correspondences between each of the displayed display regions and the display region names.

From the foregoing description of the conventional systems, it should be apparent that each has some element of inconvenience or unnaturalness for an operator.

Accordingly, an object of the present invention is to provide an apparatus for displaying a plurality of two dimensional display regions on a visual display for use with a computer system incorporating a display windowing environment.

Another object of the present invention is an apparatus for displaying a plurality of two dimensional display regions on a visual display which does not have any of the inconvenience and unnaturalness associated with the conventional systems.

Still another object of the present invention is an apparatus for displaying a plurality of two dimensional display regions on a visual display which can be easily incorporated into a conventional computer system having a display windowing environment.

Additional objects and advantages of the invention will be set forth in part in the description which follows, and in part will be obvious from the description, or may be learned by practice of the invention. The objects and advantages of the invention may be realized and attained by means of the elements and combinations particularly pointed out in the appended claims.

SUMMARY OF THE INVENTION

To achieve the foregoing objects in accordance with the purposes of the present invention, as embodied and broadly described herein, an apparatus for displaying a plurality of two dimensional display regions including a currently displayed display region on a surface of a visual display is provided, the apparatus comprising pointing means for generating X and Y coordinate signals corresponding to locations on the display, the pointing means further having means for generating a Z increment signal, means for displaying a pointer on the display at a location corresponding to a set of X and Y coordinate signals generated by the pointing means, means for storing the two dimensional display regions, means for determining a sequence of the two dimensional display regions, the sequence including a first display region, a last display region, and intervening display regions, the currently displayed display region being one of the first, last, and intervening display regions, and the sequence having an associated forward direction beginning with the first display region and ending with the last display region and an associated reverse direction beginning with the last display region and ending with the first display region, means for selecting a display region succeeding the currently displayed display region in the forward direction of the sequence, a display region preceding the currently displayed display region in the reverse direction of the sequence, or the currently displayed display region in response to the Z increment signal, irrespective of whether the location at which the pointer is displayed coincides with the selected display region and means for displaying the display regions on the display in accordance with the sequence such that the selected display region appears as the currently displayed display region, and display regions succeeding the selected display region in the forward direction of the sequence appear overlapped by the selected display region in a third dimension normal to the surface of the display with each of the displayed display regions being displayed in its entirety except where overlapped by a preceding display region in the reverse direction of the sequence, the selected display region being displayed in its entirety.

In one embodiment the pointing means comprises one of a mouse and a joystick and the means for generating the Z increment signal comprises one of a mechanical switch, a pressure sensing device, and an accelerometer.

In another embodiment, the display means includes animation means for animating the display of the display regions on the display such that they appear as a bound text and such that display regions preceding the selected display region appear as pages of the bound text folded therebehind.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 2 is an operation flow diagram of the present invention as shown in FIG. 1;

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, there is provided an apparatus for displaying a plurality of two dimensional display regions including a currently displayed display region on a surface of a visual display, the apparatus comprising pointing means for generating X and Y coordinate signals corresponding to locations on the display, the pointing means further having means for generating a Z increment signal.

Figure 1:
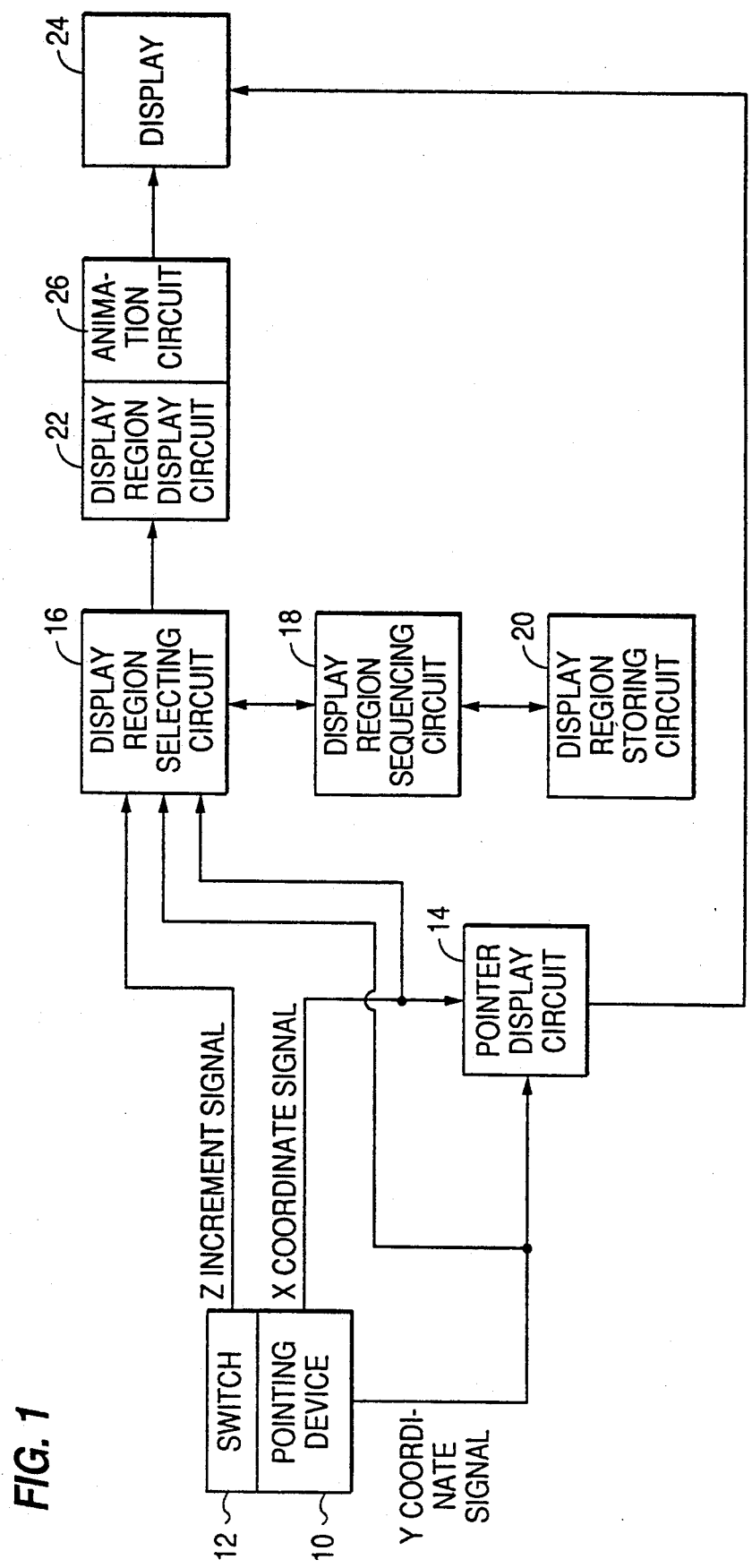
FIG. 1 is a block diagram of the present invention.

As embodied herein, and as depicted in FIG. 1, pointing means includes a pointing device 10. The pointing device 10 can comprise, for example, a conventional mouse, joystick, a cluster of arrow keys on a keyboard, or other pointing device for generating sets of X and Y coordinate signals. Each set of X and Y coordinate signals generated by the pointing device 10 corresponds to a location on a display 24.

As also embodied herein, and as depicted in FIG. 1, the means for generating a Z increment signal includes a switch 12. The switch 12 comprises, for example, a mechanical switch, a pressure sensing device, or an accelerometer for generating a Z increment signal. It should be understood that many conventional mice and joysticks have one or more buttons, each being programmable to perform an associated function when pressed. Accordingly, the switch 12 can also comprise a button of a conventional mouse or joystick which has been programmed to generate a Z increment signal when pressed in accordance with the teachings of the present invention. Similarly, the switch 12 can comprise a selected key on a keyboard which has been programmed to generate a Z increment signal when pressed in accordance with the teachings of the present invention.

Preferably, the switch 12 comprises a device for generating a Z increment signal having one of a first, a second and a third value. For example, if the switch 12 comprises a pressure sensing device, by pressing down on the switch 12, a Z increment signal having a positive value is generated. Similarly, by lifting up on the switch 12, a Z increment signal having a negative value is generated. Finally, by neither pressing down nor lifting up on the switch 12, a Z increment signal having a value of zero is generated.

In accordance with the present invention, there is provided means for displaying a pointer on the display at a location corresponding to a set of X and Y coordinate signals generated by the pointing device 10.

As embodied herein, and as depicted in FIG. 1, the means for displaying a pointer includes a pointer display circuit 14. Upon receipt of a set of X and Y coordinate signals from the pointing device 10, the pointer display circuit 14 displays the pointer on the display 24 at a location corresponding to the set of X and Y coordinate signals. The pointer displayed by the pointer display circuit 14 comprises, for example, a display region having the form of a cursor, arrow, or other object that can clearly point to a display region displayed on the display 24.

In accordance with the present invention, there is provided means for storing the two dimensional display regions.

As embodied herein, and as depicted in FIG. 1, means for storing the two dimensional display regions includes a display region storing circuit 20. The display region storing circuit 20 comprises, for example, volatile and/or nonvolatile memory including semiconductor memory, magnetic memory, and/or optical memory. The display regions stored in the display region storing circuit 20 comprise, for example, windows and/or icons. Further, depending on the computer system and display windowing environment with which the present invention is used, each of the display regions stored in the display region storing circuit 20 can include text and/or graphics.

In accordance with the present invention, there is provided means for determining a sequence of the two dimensional display regions, the sequence including a first display region, a last display region, and intervening display regions, the currently displayed display region being one of the first, last, and intervening display regions, and the sequence having an associated forward direction beginning with the first display region and ending with the last display region and an associated reverse direction beginning with the last display region and ending with the first display region.

As embodied herein, and as depicted in FIG. 1, means for determining a sequence of the two dimensional display regions includes a display region sequencing circuit 18. The display region sequencing circuit 18 selectively accesses the two dimensional display regions stored in the display region storing circuit 18 and determines a sequence of the two dimensional display regions in accordance with the computer system and display windowing environment with which the present invention is used. The sequence determined by the display region sequencing circuit 18 includes a first display region, a last display region, and intervening display regions wherein one of the first, last, or intervening display regions is a currently displayed display region in accordance with a previous sequence determined by the display region sequencing circuit 18 during a previous operation of the invention. The sequence is also associated with a forward direction beginning with the first display region and ending with the last display region and a reverse direction beginning with the last display region and ending with the first display region. For example, assuming that the present invention is being used with a word processing system, the display regions stored in the display region storing circuit 20 can represent numbered pages of text wherein the sequence is such that the pages of text are in order of increasing numerical value. In such an example, the first display region in the sequence is the page numbered with the lowest numerical value, the last display region in the sequence is the page numbered with the highest numerical value, and the intervening display regions in the sequence are the pages numbered with numerical values between the lowest and highest numerical values in order of increasing numerical value. Further, the forward direction associated with the sequence corresponds to an increase in numerical value of the page numbers while the reverse direction associated with the sequence corresponds to a decrease in numerical value of the page numbers.

In accordance with the present invention, there is provided means for selecting a display region succeeding the currently displayed display region in the forward direction of the sequence or a display region preceding the currently displayed display region in the reverse direction of the sequence in response to the Z increment signal.

As embodied herein, and as depicted in FIG. 1, means for selecting a display region includes a display region selecting circuit 16. As shown in FIG. 1, the display region selecting circuit 16 receives the X and Y coordinate signals generated by the pointing device 10 and the Z increment signal generated by the switch 12. Upon receiving the X and Y coordinate signals, the display region selecting circuit 16 determines if the location on the display 24 at which the pointer is displayed by the pointer display circuit 14 is within the boundary of at least one of the display regions displayed on the display 24 during a previous operation of the invention. If the display region selecting circuit 16 determines that the location on the display 24 at which the pointer is displayed is within the boundary of at least one of the display regions displayed on the display 24, the display region selecting circuit 16 either selects a display region succeeding the currently displayed display region in the forward direction of the sequence determined by the display region sequencing circuit 18, selects a display region preceding the currently displayed display region in the reverse direction of the sequence, or selects the currently displayed display region in response to the Z increment signal. Otherwise, selection of one of the display regions by the display region selecting circuit 16 does not occur and the display regions displayed on the display 24 remain unchanged. It should be understood that the display region selecting circuit 16 only selects a display region when the pointer is displayed on the display 24 within the boundary of at least one of the display regions to ensure that, in the case where there are a plurality of sets of display regions displayed on the display 24, only a display region grouped within a desired set of display regions is selected.

As described above, preferably, the switch 12 generates a Z increment signal having a first, second, or third value. Accordingly, if the Z increment signal has the first value, the display region selecting circuit 16 selects a display region succeeding the currently displayed display region in the forward direction of the sequence. Similarly, if the Z increment signal has the third value, the display region selecting circuit 16 selects a display region preceding the currently displayed display region in the reverse direction of the sequence. Finally, if the Z increment signal has the second value, the display region selecting circuit 16 selects the currently displayed display region.

Preferably, if the display region selecting circuit 16 selects a succeeding display region as the selected display region, as in the case where the Z increment signal has the first value, the currently displayed display region becomes a preceding display region. Similarly, if the selecting means selects a preceding display region as the selected display region, as in the case where the Z increment signal has the third value, the currently displayed display region becomes a succeeding display region. Further, although the display region selecting circuit 16 can select any display region succeeding the currently displayed display region in the forward direction of the sequence or any display region preceding the currently displayed display region in the reverse direction of the sequence, preferably, the display region selecting circuit 16 selects as the selected display region a display region immediately succeeding the currently displayed display region in the forward direction of the sequence or selects a display region immediately preceding the currently displayed display region in the reverse direction of the sequence.

In accordance with the present invention, there is provided means for displaying the display regions on the display in accordance with the sequence such that the selected display region appears as the currently displayed display region, and display regions succeeding the selected display region in the forward direction of the sequence appear overlapped by the selected display region in a third dimension normal to the surface of the display with each of the displayed display regions being displayed in its entirety except where overlapped by a preceding display region in the reverse direction of the sequence, the selected display region being displayed in its entirety.

As embodied herein, and as depicted in FIG. 1, means for displaying the display regions comprises a display region display circuit 22. Once the display region selecting circuit 16 has selected a display region, the display region display circuit 22 displays the display regions on the display 24 in accordance with the sequence determined by the display region sequencing circuit 18 such that the selected display region appears as the currently displayed display region and display regions succeeding the selected display region in the forward direction of the sequence appear overlapped by the selected display region in a third dimension normal to the surface of the display. Further, the entirety of each of the displayed display regions is displayed except where overlapped by a preceding display region in the reverse direction of the sequence and the selected display region is displayed in its entirety. Preferably, the display regions are displayed on the display 24 by the display region display circuit 22 such that display regions preceding the selected display region in the reverse direction of the sequence appear at least partially transparent in a manner known in the art.

In accordance with the present invention, the display region display circuit 22 includes animation means for animating the display of the display regions on the display 24.

As embodied herein, and as depicted in FIG. 1, animation means comprises an animation circuit 26. The animation circuit 26 animates the display regions displayed on the display 24 such that they appear to move on the display 24 during operation of the present invention.

Operation of the invention as shown in FIG. 1 will now be described in accordance with the operation flow diagram 100 shown in FIG. 2. It will be assumed that a plurality of two dimensional display regions are stored in the display region storing circuit 20, that the display region sequencing circuit 18 has determined a sequence of the two dimensional display regions, and that the display region display circuit 12 has displayed the display regions on the display 24 during a previous operation of the invention, as described above.

In step 110, an operator operates the pointing device 10 and the switch 12 such that the pointing device 10 generates X and Y coordinate signals and the switch 12 generates a Z increment signal having one of a first, second, and third value.

In step 112, the pointer display circuit 14 displays a pointer on the display 24 at a location corresponding to the X and Y coordinate signals generated by the pointing device 10.

In step 113, the display region selecting circuit 16 determines if the location of the pointer on the display 24 is within the boundary of at least one of the displayed display regions. If the location of the pointer is within the boundary of at least one of the displayed display regions, then control is passed to step 114. Otherwise, control is passed back to step 110.

In steps 114 and 116, if the Z increment signal generated by the switch 12 has the first value, the display region selecting circuit 16 selects a display region succeeding the currently displayed display region in the forward direction of the sequence and control is passed to step 124. Otherwise, control is passed to steps 118 and 120.

In steps 118 and 120, if the Z increment signal generated by the switch 12 has the second value, the display region selecting circuit 16 selects the currently displayed display region and control is passed to step 124. Otherwise, it is assumed that the Z increment signal has the third value and control is passed to step 122.

In step 122, the display region selecting circuit 16 selects a display region preceding the currently displayed display region in the reverse direction of the sequence and control is passed to step 124.

In step 124, the display region display circuit 22 displays the display regions on the display 24 in accordance with the sequence determined by the display region sequencing circuit 18 such that the selected display region appears as a new currently displayed display region and display regions succeeding the selected display region in the forward direction of the sequence appear overlapped by the selected display region in a third dimension normal to the surface of the display. Further, the entirety of each of the displayed display regions is displayed except where overlapped by a preceding display region in the reverse direction of the sequence and the selected display region is displayed in its entirety. After completion of step 124, control passes back to step 110.

Examples of the operation of the present invention will now be described in connection with FIGS. 3(a)-(c), 4(a)-(c), 5(a)-(c), and 6(a)-(d) by way of various embodiments. As shown in each of the figures, the display 24 is provided with a set of display regions 28-31 displayed thereon by the display region display circuit 22. As previously noted, it should be understood that the display 24 can have displayed thereon more than one set of display regions wherein each set includes a plurality of related display regions. It will be assumed that, collectively, the display regions 28-31 represent all or a portion of a document and that, individually, each of the display regions 28-31 represents a page of the document having an associated page number. It will also be assumed that the sequence determined by the display region sequencing circuit 18 is such that the display regions 28-31 are in order of increasing page number. It therefore follows that the first display region in the sequence is the display region 28, the last display region in the sequence is the display region 31, and the intervening display regions in the sequence are the display regions 29 and 30, in that order. It further follows that the forward direction associated with the sequence begins with the display region 28 and ends with the display region 31 while the reverse direction associated with the sequence begins with the display region 31 and ends with the display region 28. As also shown in the figures, the surface of the display 24 is defined by X and Y directions which form a plane normal to a Z direction. Finally, in the description of the embodiments that follow, it will be assumed that the display region 28 is a currently displayed display region with respect to FIGS. 3(a), 4(a), 5(a), and 6(a).

Figure 3A:
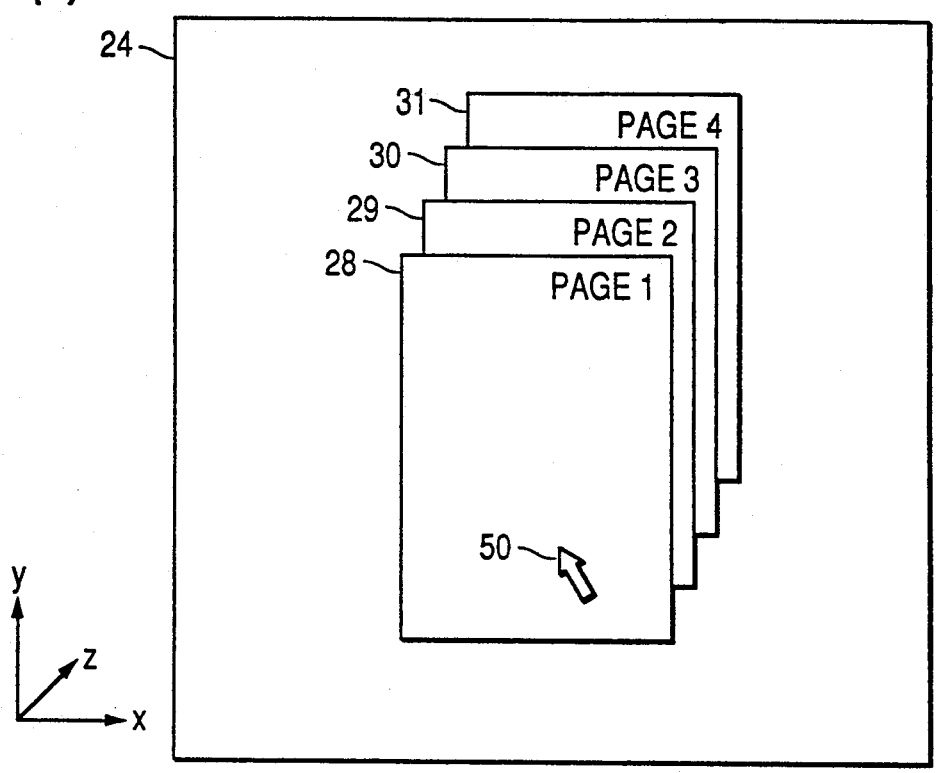
FIGS. 3(a)-(c) show a sequence of displays of a plurality of two-dimensional display regions in accordance with a first embodiment of the present invention.

In a first embodiment, as shown in FIG. 3(a), the display regions 28-31 are displayed by the display region display circuit 22 in a predetermined overlapping fixed positional relationship resembling a stack of pages. It should be understood that display regions 28-31 can also be displayed such that they overlap in an arbitrary positional relationship. Further, the pointing device 10 is operated to generated a set of X and Y coordinate signals such that the arrow 50 is displayed by the pointer display circuit 14 on the display 24 within the boundary of at least one of the display regions 28-31.

Figure 3B:
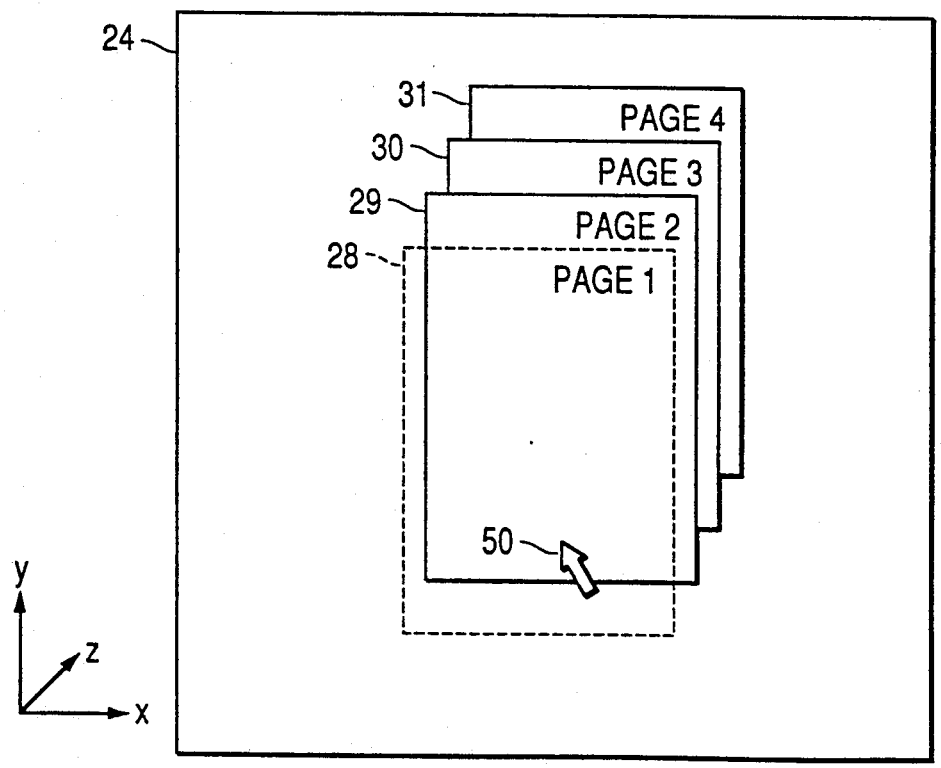

As shown in FIG. 3(b), when the switch 12 of the pointing device 10 generates a Z increment signal having a positive value, the display region selecting circuit 16 selects as a selected display region a display region which immediately succeeds the display region 28 in the forward direction of the sequence, namely, the display region 29. Upon such a selection, the display region 28 becomes a preceding display region. As further shown in FIG. 3(b), the display region display circuit 22 displays the F display regions 28-31 such that the display region 29 appears as the currently displayed display region and the display regions 30-31 appear overlapped by the display region 29 in the Z direction.

Further, the entirety of each of the display regions 30-31 is displayed except where overlapped by a preceding display region and the display region 29 is displayed in its entirety. The display region 28 may be displayed to appear at least partially transparent, i.e., only an outline of its periphery is visible, but it should be understood that the display region 28 can appear completely transparent, i.e., not displayed on the display 24 at all. Further, it should be noted that the display region selecting circuit 16 selects the display region 29 independently of the location of display of the arrow 50 as long as the arrow 50 is within the boundary of at least one of the display regions 28-31.

Figure 3C:
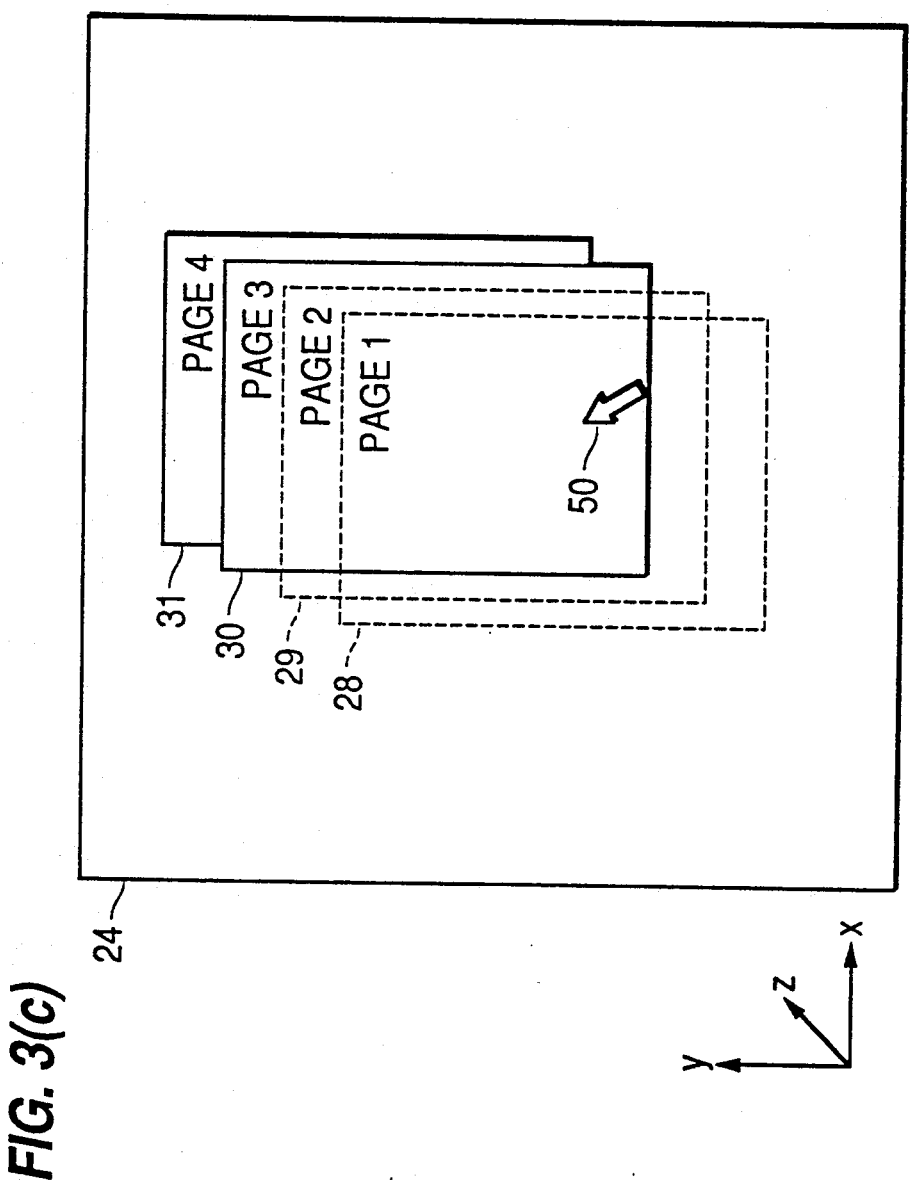

As shown in FIG. 3(c), when the switch 12 of the pointing device 10 generates another Z increment signal having a positive value while the arrow 50 is within the boundary of at least one of the display regions 28-31, the display region selecting circuit 16 selects as a selected display region a display region which immediately succeeds the display region 29 in the forward direction of the sequence, namely, the display region 30. Upon such a selection, the display region 29 becomes a preceding display region. As further shown in FIG. 3(c), the display region display circuit 22 displays the display regions 28-31 such that the display region 30 appears as the currently displayed display region and the display region 31 appears overlapped by the display region 30 in the Z direction. Further, the entirety of the display region 31 is displayed except where overlapped by the display region 30 and the display region 30 is displayed in its entirety.

Assuming that the display regions 28-31 appear as shown in FIG. 3(c), when the switch 12 of the pointing device 10 generates a Z increment signal having a negative value while the arrow 50 is within the boundary of at least one of the display regions 28-31, the display region selecting circuit 16 selects as a selected display region a display region which immediately precedes the display region 30 in the reverse direction of the sequence, namely, the display region 29. Upon such a selection, the display region 30 becomes a succeeding display region and the display region display circuit 22 displays the display regions 28-31 as shown in FIG. 3(b). Further, when the switch 12 of the pointing device 10 subsequently generates another Z increment signal having a negative value while the arrow 50 is within the boundary of at least one of the display regions 28-31, the display region selecting circuit 16 selects as a selected display region the display region which immediately precedes the display region 29, namely the display region 28, whereby the display region 29 becomes a succeeding display region and the display region display circuit 22 displays the display regions 28-31 as shown in FIG. 3(a). Finally, when the switch 12 of the pointing device 10 generates a Z increment signal having a value of zero, regardless of whether or not the arrow 50 is within the boundary of at least one of the display regions 28-31, the display of the display regions 28-31 appears unchanged.

From the foregoing description of the first embodiment, it should be understood that the display regions 28-31 are displayed on the display 24 by the display region display circuit 22 such that they appear as a stack of overlapping display regions. The display regions 28-31 can be manipulated in response to a Z increment signal generated by the switch 12 of the pointing device 10 such that the resulting display appears as if an operator has moved forward or backward throughout the stack in response to a positive or negative value, respectively, of the Z increment signal. Further, the display of the display regions 28-31 remains unchanged if the Z increment signal has a zero value.

Figure 4A:
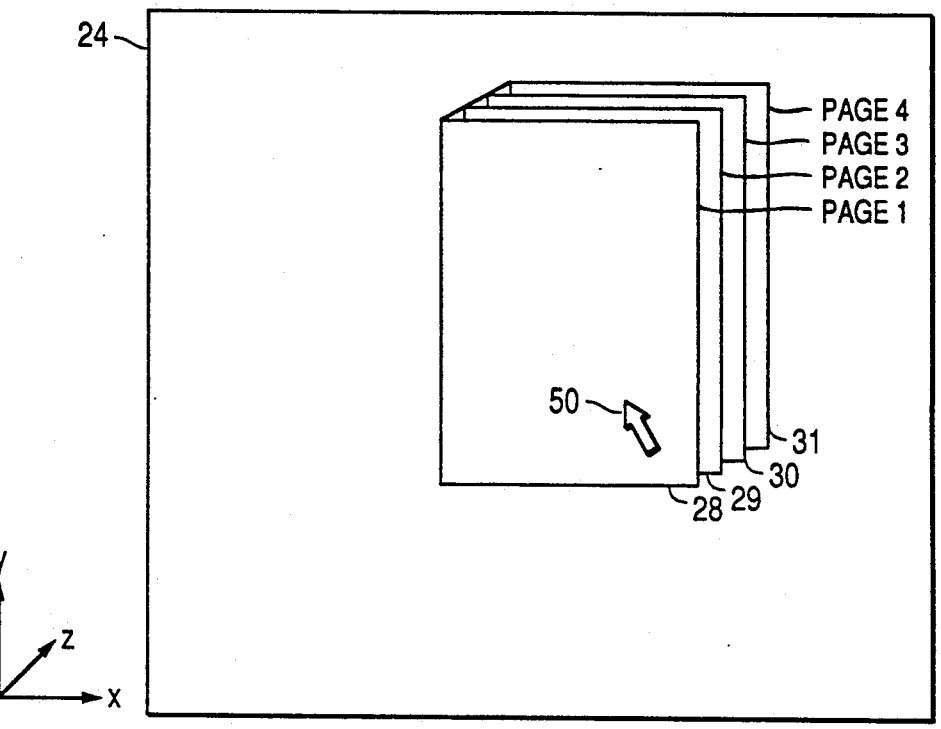
FIGS. 4(a)-(c) show a sequence of displays of a plurality of two-dimensional display regions in accordance with a second embodiment of the present invention.
Figure 4B:
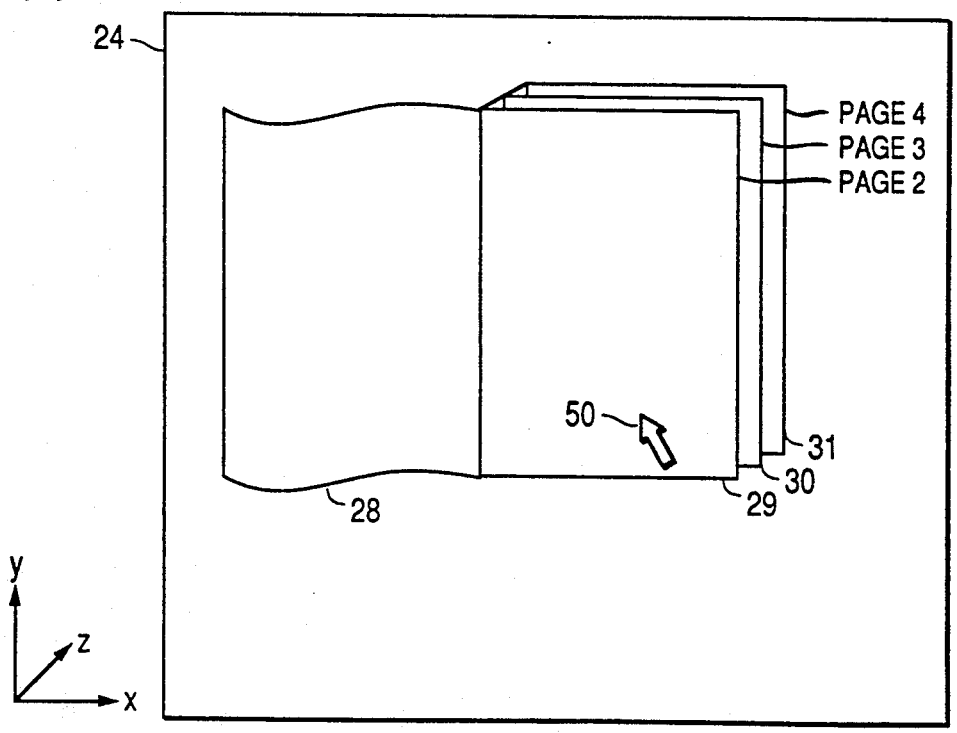
Figure 4C:
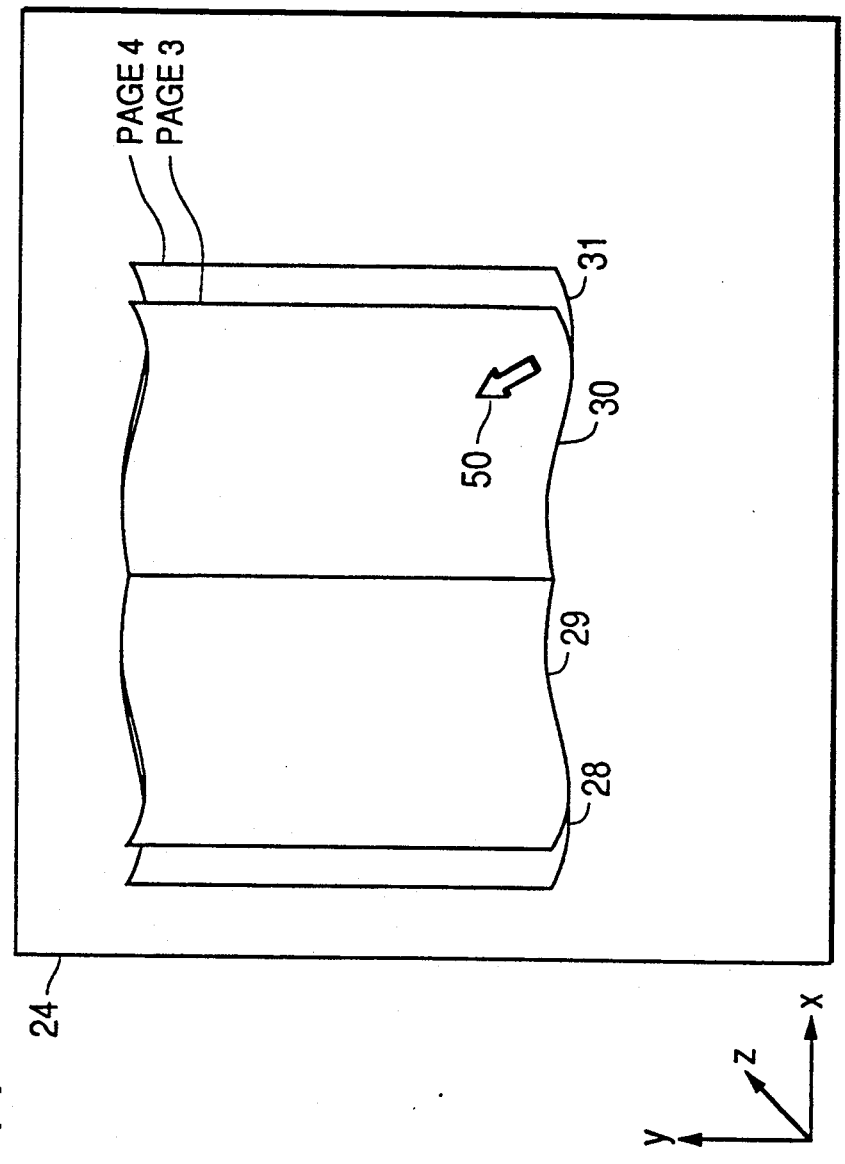

In a second embodiment, as shown in FIGS. 4(a)-(c), the display regions 28-31 are displayed on the display 24 by the display region display circuit 22 such that they resemble a bound book. Operation of the second embodiment is similar to that of the first embodiment only, upon selection of one of the display regions 28-31 by the display region selecting circuit 16, the selected display region is displayed such that it resembles an opened page of the book.

Figure 5A:
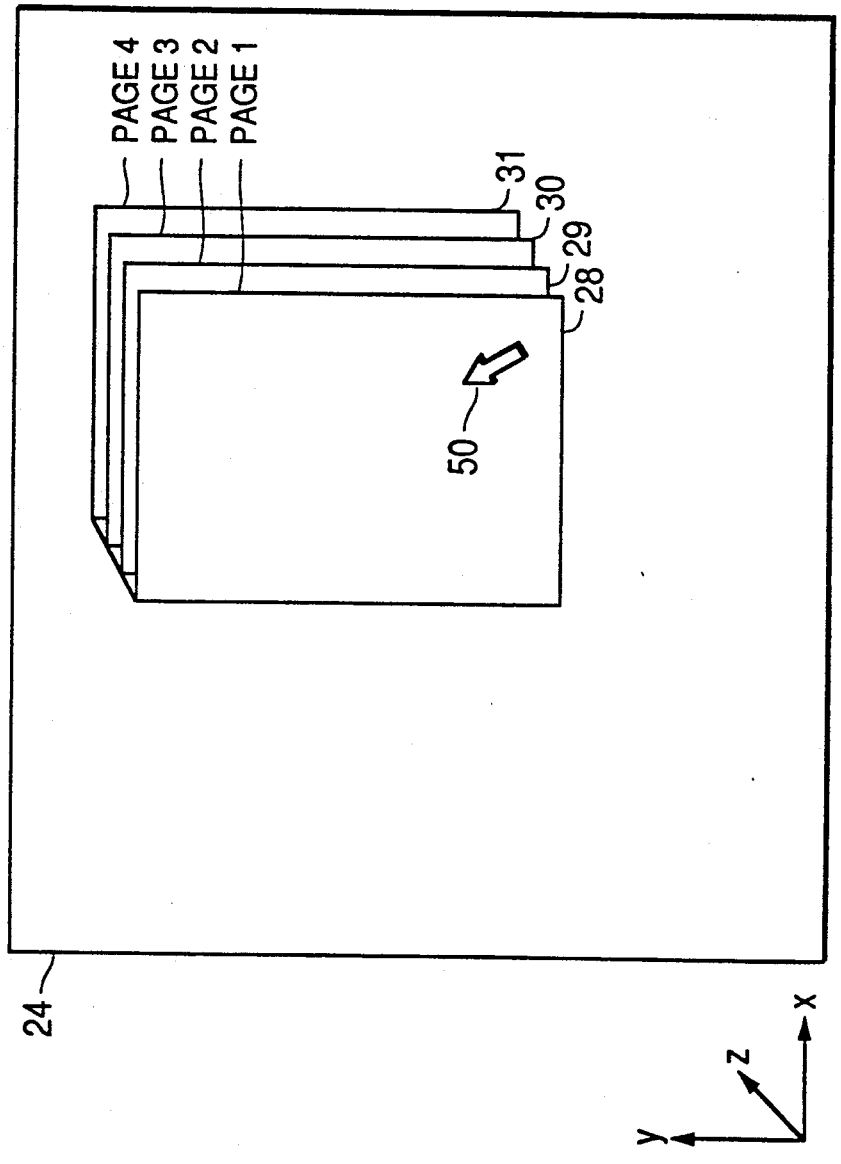
FIGS. 5(a)-(c) show a sequence of displays of a plurality of two-dimensional display regions in accordance with a third embodiment of the present invention.
Figure 5B:
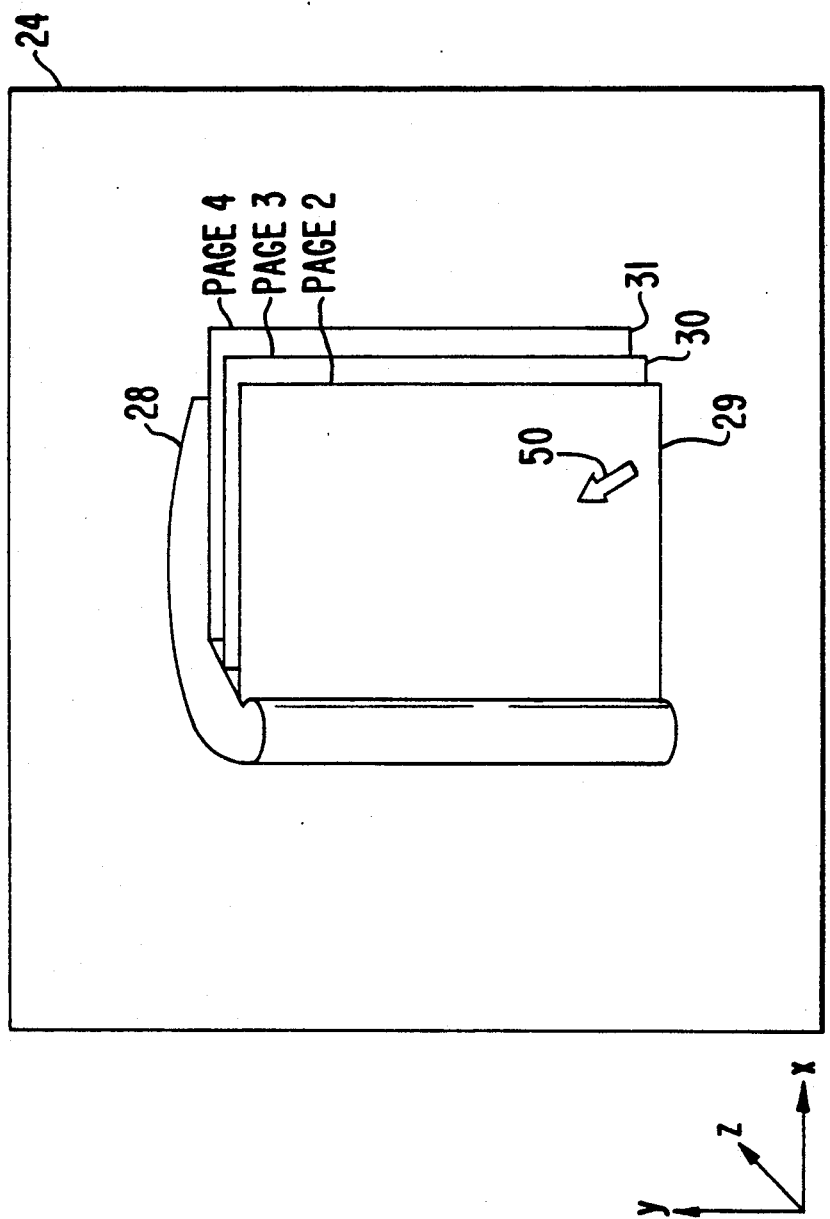
Figure 5C:
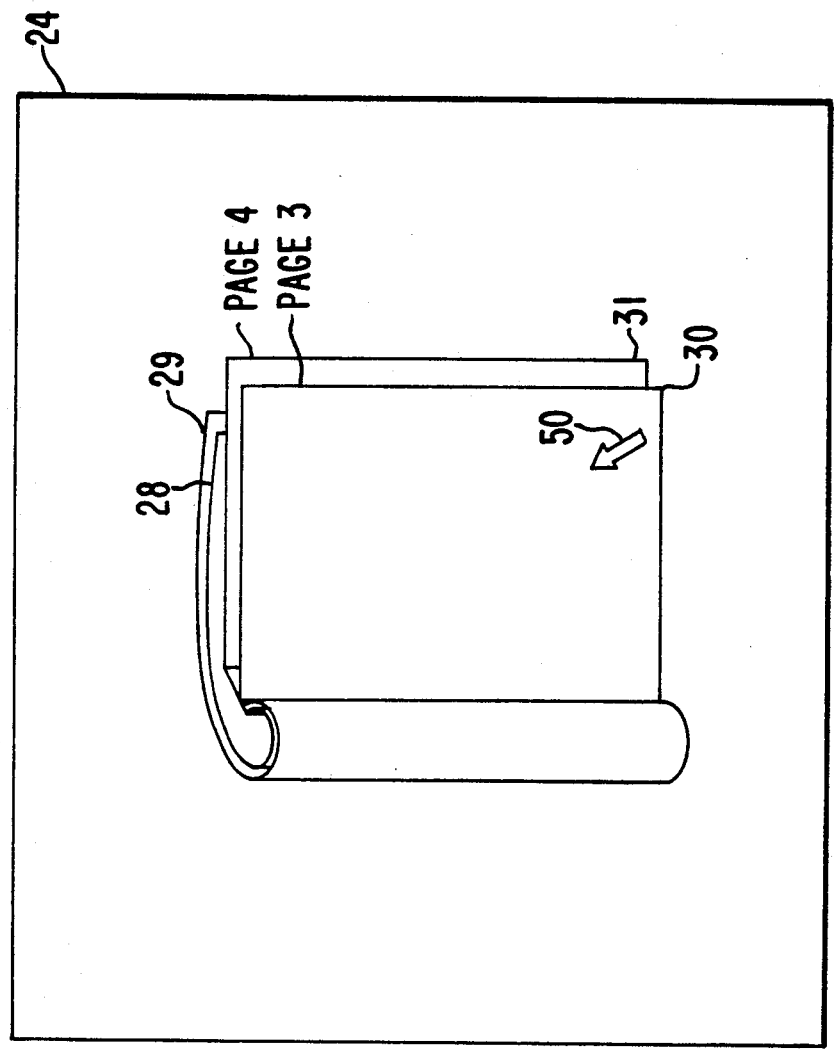
Figure 6D:
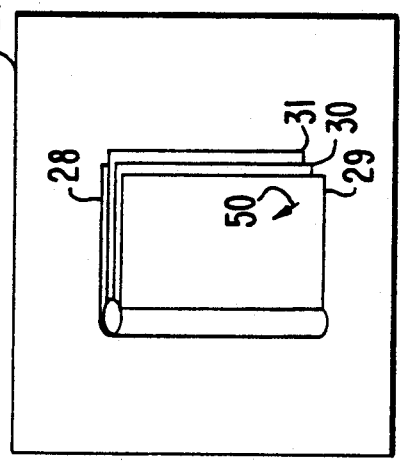
FIGS. 6(a)-(d) show a sequence of displays of a plurality of two-dimensional display regions in accordance with a fourth embodiment of the present invention.
Figure 6C:
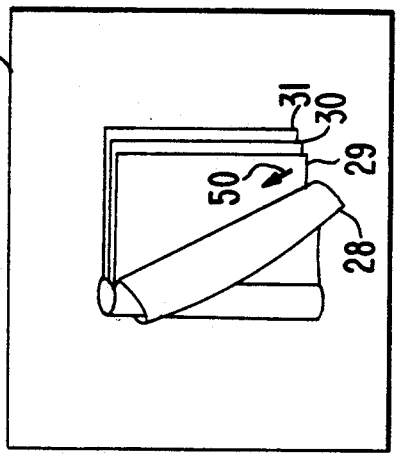
Figure 6B:
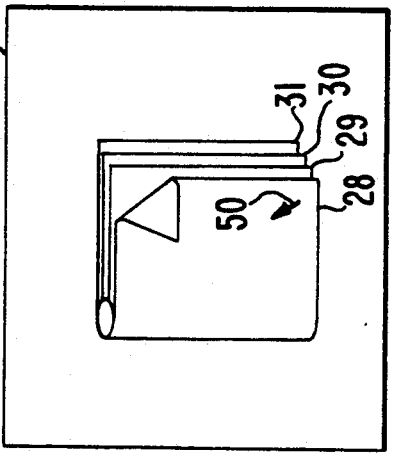
Figure 6A:
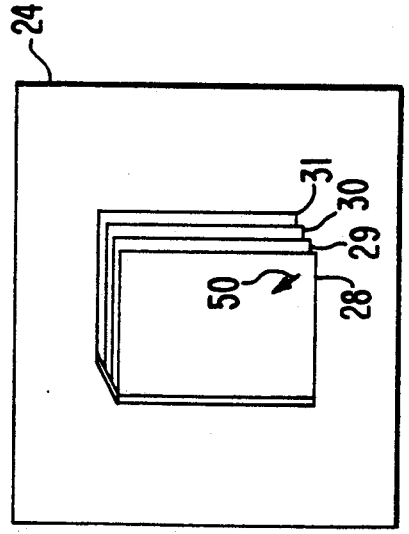

In a third embodiment, as shown in FIGS. 5(a)-(c), the display regions 28-31 are also displayed on the display 24 by the display region display circuit 22 such that they resemble a bound book. Operation of the third embodiment is similar to that of the first and second embodiments only, upon selection of one of the display regions 28-31 by the display region selecting circuit 16, the selected display region is displayed such that it resembles a page of the book with pages folded therebehind.

In a fourth embodiment, as shown in FIGS. 6(a)-(d), the display regions 28-31 are displayed on the display 24 by the display region display circuit 22 such that they resemble a bound book, as in the case of the second and third embodiments. Operation of the fourth embodiment is similar to that of the first, second, and third embodiments except that the fourth embodiment incorporates the animation circuit 26 shown in FIG. 1. Upon selection of one of the display regions 28-31 by the display region selecting circuit, the display regions 28-31 are displayed by the animation circuit 26 as a series of changing frames of images which resemble a book having its pages turned back, as shown in FIGS. 6(a)-(d). Depending on the quality and smoothness of the animation desired, the number of animated frames in the series can be increased or decreased as should be apparent to one having ordinary skill in the art.

As should be apparent from the foregoing description of the present invention, the present invention provides an apparatus for displaying a plurality of two dimensional display regions on a visual display, the apparatus being both convenient and natural for an operator to use. Further, because the present invention utilizes many components found in conventional computer systems having a display windowing environment, it can be easily incorporated into such conventional computer systems.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An apparatus for displaying a plurality of two dimensional display regions including a currently displayed display region on a surface of a display, comprising:

pointing means for generating X and Y coordinate signals corresponding to locations on the display, said pointing means further having means for generating a Z increment signal;

means for displaying a pointer on the display at a location corresponding to X and Y coordinate signals generated by said pointing means;

means for storing the plurality of two dimensional display regions;

means for determining a sequence of the plurality of two dimensional display regions, said sequence including a first display region, a last display region, and intervening display regions, the currently displayed display region being one of said first, last, and intervening display regions, and said sequence having an associated forward direction beginning with said first display region and ending with said last display region and an associated reverse direction beginning with said last display region and ending with said first display region;

means for selecting a display region succeeding the currently displayed display region in said forward direction of said sequence, a display region preceding the currently displayed display region in said reverse direction of said sequence, or the currently displayed display region in response to said Z increment signal, irrespective of whether the location at which said pointer is displayed coincides with said selected display region; and means for displaying the plurality of two dimensional display regions on the display in accordance with said sequence such that said selected display region appears as the currently displayed display region, and display regions succeeding said selected display region in said forward direction of said sequence appear overlapped by said selected display region in a third dimension normal to the surface of the display with each of said displayed display regions being displayed in its entirety except where overlapped by a preceding display region in said reverse direction of said sequence, said selected display region being displayed in its entirety.

2. The apparatus of claim 1, wherein the displaying means includes means for designating the currently displayed display region as a preceding display region when said selecting means selects a succeeding display region as said selected display region and for designating the currently displayed display region as a succeeding display region when said selecting means selects a preceding display region as said selected display region.

3. The apparatus of claim 1, wherein said selecting means includes means for selecting as said selected display region a display region immediately succeeding the currently displayed displaying region in said forward direction of said sequence or selects a display region immediately preceding the currently displayed display region in said reverse direction of said sequence.

4. The apparatus of claim 1, wherein said pointing means includes one of a mouse, a joystick, and a cluster of arrow keys on a keyboard.

5. The apparatus of claim 1, wherein said display means includes means for displaying the display regions on the display such that they resemble a bound book.

6. The apparatus of claim 1, wherein said display means includes animation means for displaying the display regions on he display as a series of changing frames of images.

7. An apparatus for displaying a plurality of two dimensional display regions including a currently displayed display region on a surface of a display, comprising:

pointing means for generating X and Y coordinate signals corresponding to locations on the display, said pointing means further having means for generating a Z increment signal;

means for displaying a pointer on the display at a location corresponding to X and Y coordinate signals generated by said pointing means;

mean for storing the plurality of two dimensional display regions;

means for determining a sequence of the plurality of two dimensional display regions, said sequence including a first display region, a last display region, and intervening display regions, the currently displayed display region being one of said first, last, and intervening display regions, and said sequence having an associated forward direction beginning with said first display region and ending with said last display region and an associated reverse direction beginning with said last display region and ending with said first display region;

means for selecting a display region succeeding the currently displayed display region in said forward direction of said sequence, a display region preceding the currently displayed display region in said reverse direction of said sequence, or the currently displayed display region in response to said Z increment signal; and means for displaying the plurality of two dimensional display regions on the display in accordance with said sequence such that said selected display region appears as the currently displayed display region, and display regions succeeding said selected display region in said forward direction of said sequence appear overlapped by said selected display region in a third dimension normal to the surface of the display with each of said displayed display regions being displayed in its entirety except where overlapped by a preceding display region in said reverse direction of said sequence, said selected display region being displayed in its entirety, said displaying means including means for displaying the plurality of two dimensional display regions on the display such that display regions preceding said selected display region in said reverse direction of said sequence appear at least partially transparent.

8. An apparatus for displaying a plurality of two dimensional display regions including a currently displayed display region on a surface of a display, comprising:

pointing means for generating X and Y coordinate signals corresponding to locations on the display, said pointing means further having means for generating a Z increment signal;

means for displaying a pointer on the display at a location corresponding to X and Y coordinate signals generated by said pointing means;

means for storing the plurality of two dimensional display regions;

means for determining a sequence of the plurality of two dimensional display regions, said sequence including a first display region, a last display region, and intervening display regions, the currently displayed display region being one of said first, last, and intervening display regions, and said sequence having an associated forward direction beginning with said first display region and ending with said last display region and an associated reverse direction beginning with said last display region and ending with said first display region;

means for selecting a display region succeeding the currently displayed display region in said forward direction of said sequence, a display region preceding the currently displayed display region in said reverse direction of said sequence, or the currently displayed display region in response to said Z increment signal; and means for displaying the plurality of two dimensional display regions on the display in accordance with said sequence such that said selected display region appears as the currently displayed display region, and display regions succeeding said selected display region in said forward direction of said sequence appear overlapped by said selected display region in a third dimension normal to the surface of the display with each of said displayed display regions being displayed in its entirety except where overlapped by a preceding display region in said reverse direction of said sequence, said selected display region being displayed in its entirety, wherein said Z increment signal has one of a first, second, and third value and wherein said selecting means includes means for selecting a display region succeeding the currently displayed display region in said forward direction of said sequence when said Z increment has said first value, selecting the currently displayed display region when said Z increment signal has said second value, and selecting a display region preceding the currently displayed display region in said reverse direction of said sequence when said Z increment has said third value.

9. An apparatus for displaying a plurality of two dimensional display regions including a currently displayed display region on a surface of a display, comprising:

pointing means for generating X and Y coordinate signals corresponding to locations on the display, said pointing means further having means for generating a Z increment signal, said means for generating said Z increment signal including one of a mechanical switch, a pressure sensing device, and an accelerometer;

means for displaying a pointer on the display at a location corresponding to X and Y coordinate signals generated by said pointing means;

means for storing the plurality of two dimensional display regions;

means for determining a sequence of the plurality of two dimensional display regions, said sequence including a first display region, a last display region, and intervening display regions, the currently displayed display region being one of said first, last, and intervening display regions, and said sequence having an associated forward direction beginning with said first display region and ending with said last display region and an associated reverse direction beginning with said last display region and ending with said first display region;

means for selecting a display region succeeding the currently displayed display region in said forward direction of said sequence, a display region preceding the currently displayed display region in said reverse direction of said sequence, or the currently displayed display region in response to said Z increment signal; and means for displaying the plurality of two dimensional display regions on the display in accordance with said sequence such that said selected display region appears as the currently displayed display region, and display regions succeeding said selected display region in said forward direction of said sequence appear overlapped by said selected display region in a third dimension normal to the surface of the display with each of said displayed display regions being displayed in its entirety except where overlapped by a preceding display region in said reverse direction of said sequence, said selected display region being displayed in its entirety.

10. An apparatus for displaying a plurality of two dimensional display regions including a currently displayed display region on a surface of a display, comprising:

pointing means for generating X and Y coordinate signals corresponding to locations on the display, said pointing means further having means for generating a Z increment signal;

means for displaying a pointer on the display at a location corresponding to X and Y coordinate signals generated by said pointing means;

means for storing the plurality of two dimensional display regions;

means for determining a sequence of the plurality of two dimensional display regions, said sequence including a first display region, a last display region, and intervening display regions, the currently displayed display region being one of said first, last, and intervening display regions, and said sequence having an associated forward direction beginning with said first display region and ending with said last display region and an associated reverse direction beginning with said last display region and ending with said first display region;

means for selecting a display region succeeding the currently displayed display region in said forward direction of said sequence, a display region preceding the currently displayed display region in said reverse direction of said sequence, or the currently displayed display region in response to said Z increment signal; and means for displaying the plurality of two dimensional display regions on the display in accordance with said sequence such that said selected display region appears as the currently displayed display region, and display regions succeeding said selected display region in said forward direction of said sequence appear overlapped by said selected display region in a third dimension normal to the surface of the display with each of said displayed display regions being displayed in its entirety except where overlapped by a preceding display region in said reverse direction of said sequence, said selected display region being displayed in its entirety, said display means including animation means for displaying the display regions on the display as a series of changing frames of images and said animation means including means for animating the display regions such that the series of changing frames of images resemble a bound book having pages which are being turned back.

* * * * *